July 23, 1940.  L. GOODALL  2,208,972
ROTARY GRASS CUTTER
Filed March 9, 1939   2 Sheets-Sheet 1
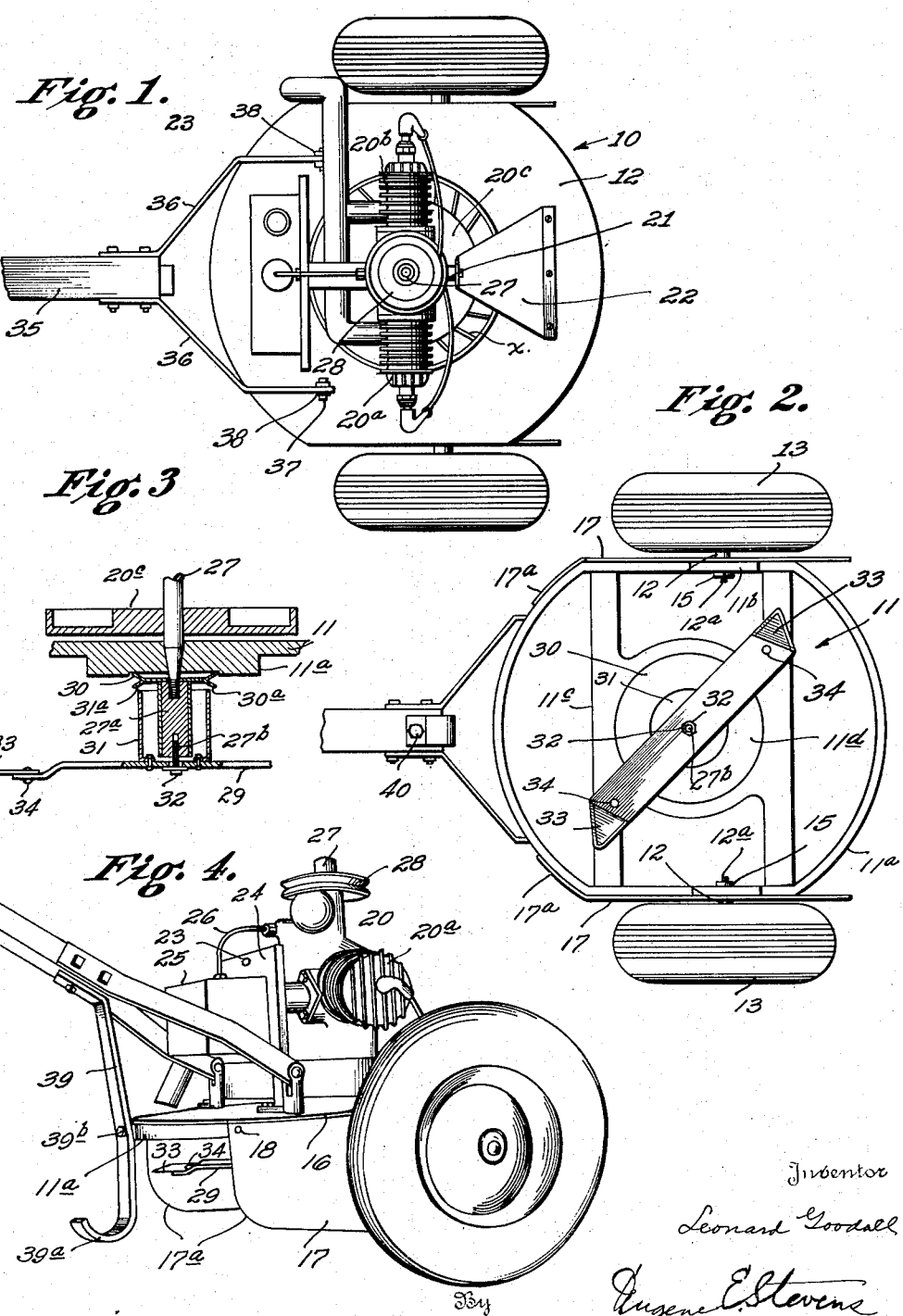

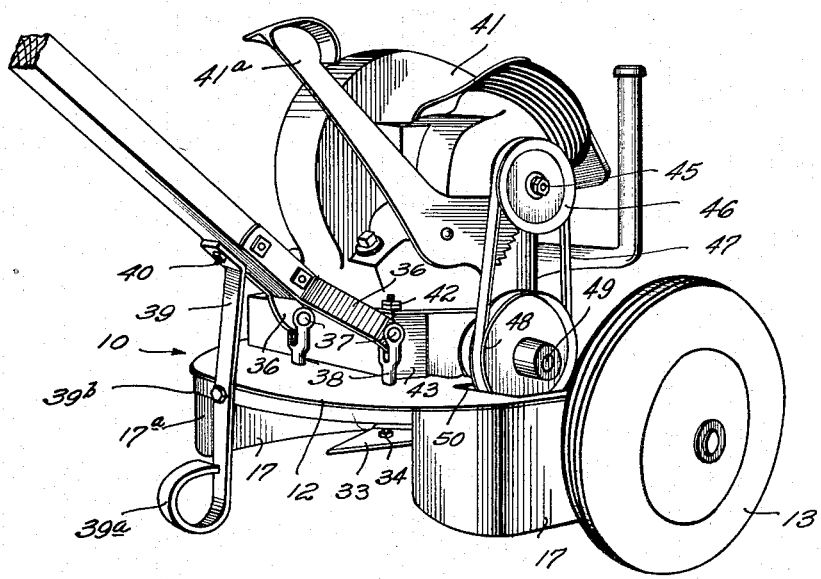
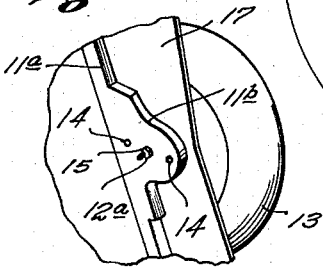
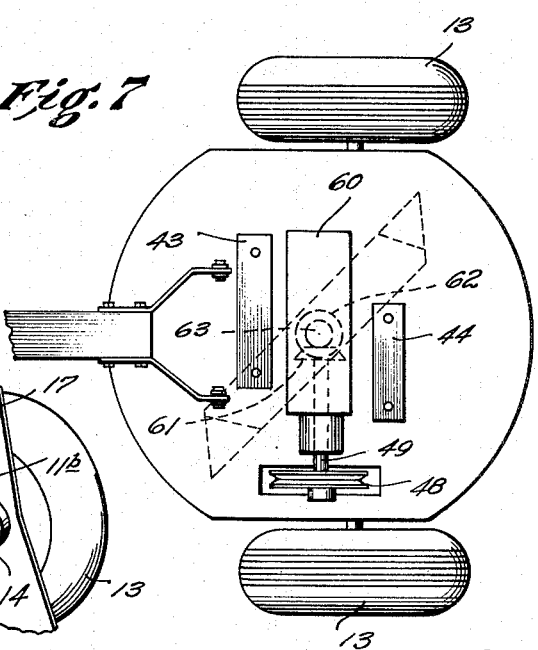

Patented July 23, 1940

2,208,972

UNITED STATES PATENT OFFICE 2,208,972

ROTARY GRASS CUTTER

Leonard Goodall, Warrensburg, Mo.

Application March 9, 1939, Serial No. 260,828

1 Claim. (Cl. 56—25.4)

My invention relates to improvements in rotary mowers which are adapted for use in cutting weeds and tall grass upon the lawns of estates and the like.

One of the primary objects of my invention is to provide a mower of the class described which is susceptible of adjustment for cutting the grass of lawns as short as would ordinarily be required—the nature of the invention being such that vertical adjustment of the cutter can be quickly made without the exercise of more than ordinary mechanical skill, and without the expenditure of any considerable amount of time.

Another object of the invention resides in the provision of a novel device of this character wherein the wheeled base frame is adapted to support power plants of different kinds without substantial modification, such as electric motors, expansion engines and others of known forms.

Additionally, the invention contemplates in a device of this kind a power plant which preferably takes the form of an internal combustion engine which is adapted to be mounted upon a wheeled frame in such fashion that the crank shaft of the engine provides not only a carrier for the cutting blade assembly, but also a friction clutch-like drive for said cutter blade assembly.

A further and more specific object of the invention having to do with a phase thereof which embodies the use of an internal combustion engine of particular form, resides in the provision of a novel support for said engine—in addition to the wheeled base—wherein one element of said support provides a carrier for a gasoline tank, or some other accessory of the engine. Still another object of the invention is to provide in a device of the character specified a novel combined clutch element and carrier for the driven rotary blade carrier.

The invention also resides in certain novel features of construction, combination and arrangement of the various parts, and in modes of operation—all of which will be readily appreciated and understood by those familiar with apparatus of this sort, upon inspection of the accompanying drawings in connection with the following detailed description.

In the drawings, wherein the same reference characters have been used to designate the same parts throughout the several views—

Figure 1 is a top plan view of an apparatus incorporating my invention;

Figure 2 is a bottom plan view of the same;

Figure 3 is a fragmentary sectional view illustrating the engine fly wheel, cutter carrying member, and the clutch drive connection;

Figure 4 is a perspective view of the device;

Figure 5 is a fragmentary perspective of the bottom portion of the device illustrating the extension of the clutch drive means; and also the means for adjusting the frame in reference to the ground;

Figure 6 is a perspective view illustrating the invention in slightly modified form in that it incorporates a different type of prime mover;

Figure 7 is a top plan view of the device shown in Figure 6, but with the engine removed.

Referring to the drawings by reference characters and especially to Figures 1, 2 and 4, numeral 10 designates generally the substantially disk-like base member of the machine which comprises the casting 11 having the marginal downwardly extending flange 11a providing the extensions which define the opposed bearing portions 11b for the stub axles 12 which carry the preferably inflated rubber tired wheels 13.

It will be noted from Figure 5 that bearings 11b provide the vertical series of holes 14 for selectively receiving the reduced stub axle portions 12a so that the spacement of the wheeled base member 10 from the ground can be varied. The inner ends of stub axle reductions 12a are threaded to receive the nuts 15 which clamp said stub axles 12, 12a in place. Casting 11 has the spaced twin reinforcing rib portions 11c which sustain the medially bored central boss 11d and extend to flange 11a.

The upper part of the casting 11 of base member 10 is faced with heavy sheet metal 16 which may, and preferably does, provide the depending forwardly extending side skirts 17 having the rearwardly curved portions 17a which conform to the contour of base member casting 11. Screws 18 secure side skirts 17 to flange 11a.

In the form of the invention shown in Figures 1-5, inclusive, the power plant is the two cylinder internal combustion engine which is generally designated at 20. The frame of this engine is bolted as at 21 to a vertical front support 22 carried by base member 10 and at two points 23 to the forward face of a vertical and similarly carried rear support 24.

It is to be noted that the rear support 24 has secured to its rear face the gasoline, or other fuel tank, 25, having the fuel line 26 leading to the carburetor of the engine.

It will be observed from an inspection of Figures 1 and 4 that the upper end of the crank shaft 27 has suitably keyed thereto the pulley 28 for receiving a rope, cord, or the like, when the engine is to be started, as is well known to those who are familiar with this type of engine.

No attempt is going to be made to describe the engine in detail. It is old, and well known in the art of power plants for lawn mowers, detachable power plants for motor boats, etc. Suffice it to say that the cylinders are designated at 20a, 20b, respectively, and that the conventional fly wheel 20c is annularly cored out at its periphery to receive the fan-like blades x which help cool the motor.

Coming now to an important feature of the invention, it will be observed from an inspection of Figure 3 that the lower portion of the crank shaft 27 is journalled in the hole in the boss 11d, and has the squared extension 27a threaded thereon extending therebelow, the end of said extension 27a being internally threaded to receive a bolt 27b. Suitably retained upon the squared extension 27a of said crank shaft is the driving clutch element for the mower blade carrier 29. In the present instance, and for the purpose of convenience only, said driving clutch element takes the form of the pulley 30.

The blade carrier is a bar 29 which has downwardly offset ends 29a to which are secured, by means of rivets or the like 34, the cutter blade sections 33. Midway between the ends of bar 29 and surrounding the extension 27a, there is rigidly secured a sleeve member 31. The bar 29 is apertured concentrically of the sleeve member 31 to receive the bolt 27b of crank shaft 27. This permits relative rotary movement of the bar and sleeve assembly 29, 31 with respect to crank shaft extension 27a, 27b. The head 32 of bolt 27b threaded in the end of crank shaft extension 27a serves to cause the tapered upper edge 31a of sleeve 31 to make a friction drive connection with the reversely tapered outer face 30a of the driving clutch element—in this instance, the pulley—30.

A guiding and inclination control handle 35 is provided as is usual in conjunction with lawn mowers. The inner end of this handle has secured to opposite sides thereof the divergent angle irons 36 whose parallel inner ends are secured by means of pivot pins 37 in the bifurcated upstanding bearings 38, which are suitably bolted to the base member 10.

The inner end of handle 35 may be provided with the depending skid 39 whose rearwardly curved lower end 39a is adapted to engage the ground when the mower is at rest, so as to avoid distortion of the depending skirt elements 17— whose function is, of course, to prevent the grass from diverging laterally out of the path of the cutters 33. The ends 17a of skirt 17 prevent the cuttings from being thrown against the operator's feet, and spread the grass evenly over the ground. A single bolt 40 may be used to hold the skid member 39 in operative position. Referring now to the form of invention disclosed in Figures 6 and 7 the wheeled base 10 and cutter assembly is the same as that described in connection with Figures 1–5, inclusive; and the same applies to the handle assembly 35, 36, 37, 38. In short, the only difference between the form of invention shown in Figures 1–5, inclusive, and that shown in Figures 6 and 7 is that a different form of power plant is shown in Figures 6 and 7.

The power plant of Figures 6 and 7 takes the form of a one cylinder internal combustion engine 41 having the horizontal crank shaft 45. The frame of this engine 41 is bolted, front and rear, upon the blocks 43, 44, as indicated at 42 in Figure 6. And it might here be noted that the intermediate portion of the engine frame rests upon a gear box 60 to which reference will presently be made.

Figure 6 illustrates the crank shaft 45 as having the pulley 46 which, acting through belt 47 trained over the pulley 48, establishes a drive connection to the cutter assembly through the gear box 60. The pulley 48 is keyed upon the horizontal shaft 49 which is journalled in the gear box 60 and has the drive gear 61 which meshes with the bevelled gear 62 of the shaft 63 which extends vertically through the hole in the base boss 11d in the same fashion as does the end of crank shaft 27 of the engine 20 shown in Figures 1–5, inclusive.

In the form of invention shown in Figures 6 and 7, the gear box 60 is suitably bolted to base 10, and the latter happens, in the present instance, to be provided with the well 50 into which dips the pulley 48 of the horizontal shaft 49 of said gear box.

No novelty is claimed for the engine which is illustrated in Figure 6. It is a familiar type of one cylinder engine and provided with the usual starting means 41a which takes the form of a foot lever suitably pivoted to the frame, and having a gear segment at its inner end for operatively engaging the conventional pinion means of crank shaft 45.

By way of summary, it may be stated that the gear box 60 with its vertical shaft 63 (the latter the counterpart of crank shaft extension 27a of Figure 3) simply takes the place of the lower part, or crank shaft drive that engine 20 provides for the cutter carrier 29.

The operation of the device will be obvious from what has been said. The operator simply adjusts the base to the proper distance to the ground by selection of the proper holes 14 in bearings 11b for the stub axles 12 of wheels 13, and then he starts the motor and guides the device over the grass to be cut. Handle 35 is made rigid with the frame or base member 10 by means of bolt 39b which secures the frame carried skid member 39 to the flange 11a of the base member casting 11, as clearly illustrated in Figures 4 and 6.

The form of invention illustrated in Figures 6 and 7 involves the use of an extremely low cost motor which is readily mountable upon base member 10 and involves the use of the very simple and inexpensive gear box assembly 60. Should any trouble develop with the motor, it may of course be readily removed—and as to this, the same obviously applies to the motor of Figures 1–4.

The motor shown in Figs. 1–4 is considered especially desirable because it eliminates the use of belts and gears by providing a direct crank shaft drive for the cutter carrier 29. The maximum weight of either of the illustrated forms of the invention will not exceed sixty pounds. Either motor will drive the cutter blade carrier 29 at a speed of eighteen hundred R. P. M. The cutter blades 33 cost but a few cents. The wheels 13 will have a ball bearing mounting upon stub shafts 12 necessitating oiling but once a month or so. The oil for the engine will be mixed with the gasoline as is customary in engines of this type. One quart of gasoline will operate the device for three hours or more. By raising the handle 35 and tilting the device downwardly to bring the cutter elements 33 into proximity with the ground, it is possible to virtually shave the lawn including those objectionable tassel weeds which defy the usual reel-type lawn mower and require subsequent sickle treatment.

Another point which might be emphasized, is the perfect balance of both of the illustrated embodiments of the invention. In each instance, the motor is disposed in the exact center of base member 10. A further outstanding feature of advantage is the clutch drive 31, 30 of Figure 3. Should the blades or cutters 33 or the carrier 29 strike a stone or other obstruction, the driving clutch element 30 will simply slip about the end of sleeve 31 which constitutes the driven clutch element. Therefore, the clutch drive will not be injured; nor, for that matter, the blades 33 or their carrier 29.

It is of exceeding commercial advantage from the manufacturing point of view that the frame 10 or base member, is adapted for both forms of the invention as illustrated.

Having thus described my invention, what I claim as new and desire to secure by Letters Patent is:

The combination of a rotary type grass cutting mower comprising a wheeled base, a driven rotary cutter operating beneath said base member and between said wheels, a prime mover having a crank shaft extending vertically through said base, the lower end of said crank shaft provided with a driving clutch element, a crank-shaft extension secured at the lower end of said shaft, a carrier for said cutter and rotatably carried by the crank shaft extension of said shaft, said carrier constituting a driven friction clutch element, and clamp means tending to draw said clutch elements together.

LEONARD GOODALL.